(12) United States Patent
Xiao et al.

(10) Patent No.: US 11,637,785 B2
(45) Date of Patent: Apr. 25, 2023

(54) WIRELESS COMMUNICATION METHOD AND DEVICE

(71) Applicants: Sharp Kabushiki Kaisha, Sakai (JP); FG Innovation Company Limited, Tuen Mun (HK)

(72) Inventors: Fangying Xiao, Shanghai (CN); Takako Hori, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 207 days.

(21) Appl. No.: 16/759,583

(22) PCT Filed: Oct. 18, 2018

(86) PCT No.: PCT/CN2018/110842
§ 371 (c)(1),
(2) Date: Apr. 27, 2020

(87) PCT Pub. No.: WO2019/085763
PCT Pub. Date: May 9, 2019

(65) Prior Publication Data
US 2020/0287836 A1 Sep. 10, 2020

(30) Foreign Application Priority Data
Oct. 31, 2017 (CN) .......................... 201711051853.8

(51) Int. Cl.
*H04L 47/34* (2022.01)
*H04W 28/10* (2009.01)

(52) U.S. Cl.
CPC .............. *H04L 47/34* (2013.01); *H04W 28/10* (2013.01)

(58) Field of Classification Search
CPC ..... H04L 47/34; H04L 69/321; H04L 69/322; H04W 28/10; H04W 28/04; H04W 80/02
See application file for complete search history.

(56) References Cited

U.S. PATENT DOCUMENTS

2002/0015385 A1* 2/2002 Yi ..................... H04L 1/1685
370/236
2006/0262811 A1* 11/2006 Jiang ................. H04L 1/0079
370/474
(Continued)

FOREIGN PATENT DOCUMENTS

CN      101030839 A    9/2007
CN      101483505 A    7/2009
(Continued)

OTHER PUBLICATIONS

Ericsson, "RLC PDU creation an SDU/PDU discard", 3GPP TSG-RAN WG2 #99bis, Tdoc R2-1711249, Oct. 9-13, 2017, 4 pages.
(Continued)

*Primary Examiner* — Christine Ng
(74) *Attorney, Agent, or Firm* — ScienBiziP, P.C.

(57) ABSTRACT

The present disclosure provides a method executed by user equipment, including: receiving, by a radio link control "RLC" entity, a service data unit "SDU" from an upper layer. The method further includes: generating, by the RLC entity, a protocol data unit "PDU," the PDU including at least a part of the received SDU, and a sequence number of the PDU being set according to a send state variable. The method further includes: updating, by the RLC entity, the send state variable. Furthermore, the present disclosure further provides corresponding user equipment.

2 Claims, 2 Drawing Sheets

(56) References Cited

U.S. PATENT DOCUMENTS

| | | | |
|---|---|---|---|
| 2015/0305012 A1 | 10/2015 | Yi et al. | |
| 2016/0142184 A1* | 5/2016 | Yi | H04W 76/19 |
| | | | 714/748 |
| 2017/0290055 A1* | 10/2017 | Koskinen | H04L 43/0858 |
| 2018/0115491 A1* | 4/2018 | Jonsson | H04L 47/34 |

FOREIGN PATENT DOCUMENTS

| | | |
|---|---|---|
| CN | 101925195 A | 12/2010 |
| CN | 104935413 A | 9/2015 |
| WO | 2009076124 A1 | 6/2009 |

OTHER PUBLICATIONS

Sharp, "Consistence of RLC Tx behavior", 3GPP TSG-RAN WG2 #99bis, R2-1710249, Oct. 9-13, 2017, pp. 1-10.

"3rd Generation Partnership Project; Technical Specification Group Radio Access Network; NR; Radio Link Control (RLC) protocol specification (Release 15)", 3GPP TS 38.322 V1.0.0, Sep. 2017, pp. 1-32.

Official Communication issued in International Patent Application No. PCT/CN2018/110842, dated Dec. 27, 2018.

"3rd Generation Partnership Project; Technical Specification Group Radio Access Network; Evolved Universal Terrestrial Radio Access (E-UTRA); Radio Link Control (RLC) protocol specification (Release 14)", 3GPP TS 36.322 V714.1.0, Sep. 2017, pp. 1-45.

NTT Docomo, Inc., "New SID Proposal: Study on New Radio Access Technology", 3GPP TSG RAN Meeting #71, RP-160671, Mar. 7-10, 2016, 8 pages.

Ericsson, "Introducing flexible RLC PDU size in the uplink", 3GPP TSG-RAN2 Meeting #61 Sorrento, Italy, Feb. 11-15, 2008, R2-080788.

\* cited by examiner

WIRELESS COMMUNICATION METHOD AND DEVICE

TECHNICAL FIELD

The present disclosure relates to the field of wireless communications technologies, and in particular, to a method executed by user equipment and corresponding user equipment.

BACKGROUND

A new research project on 5th Generation (5G) technical standards (see non-patent literature: RP-160671: New SID Proposal: Study on New Radio Access Technology) was proposed in the 3rd Generation Partnership Project (3GPP) RAN #71 plenary session held in March 2016. The goal of the research project is to develop a New Radio (NR) access technology to meet all of the application scenarios, requirements, and deployment environments of 5G. NR mainly has three application scenarios: enhanced mobile broadband communication, large-scale machine-type communication, and ultra-reliable low-latency communication.

It was agreed in 3GPP RAN2 #96 meeting held in October 2016 that cascade operations are not supported in NR Radio Link Control (RLC) entities. It was agreed in RAN2 NR Adhoc #2 meeting held in June 2017 that data preprocessing similar to that of a single carrier can be performed on a split bearer. It was agreed in RAN2 #99 meeting held in August 2017 that NR UE can perform data preprocessing on an uplink split bearer before reception of a request (or a data transmission request) from a lower layer, and submit data (namely, preprocessed data) to the lower layer before reception of the request from the lower layer. It was agreed in RAN2 #99bis meeting held in October 2017 that an RLC entity discards one RLC SDU only when no segment of the RLC SDU is transmitted on an air interface or mapped to one transmission block or transmitted in a transmission opportunity of a notification from the lower layer. The conclusions reached in the previous sessions will affect processing flows of a transmitting side of an NR RLC entity.

SUMMARY

The present disclosure relates to problems involved in processing flows of a transmitting side of an RLC entity, comprising a processing flow of an AM RLC transmitting side or a UM RLC transmitting entity for an RLC SDU from an upper layer, and a function and update of a send state variable.

In order to solve at least a part of the above problems, the present disclosure provides a method executed by user equipment, comprising receiving, by a radio link control "RLC" entity, a service data unit "SDU" from an upper layer. The method further comprises generating, by the RLC entity, a protocol data unit "PDU." The PDU comprises at least a part of the received SDU, and a sequence number of the PDU is set according to a send state variable. The method further comprises updating, by the RLC entity, the send state variable.

In one embodiment, the sequence number of the PDU may be set to the value of the send state variable or a value corresponding to the value of the send state variable.

In one embodiment, the value of the send state variable may be incremented if the generated PDU comprises the RLC SDU or a first segment of the RLC SDU.

In one embodiment, the value of the send state variable may be incremented if the generated PDU comprises the RLC SDU or the last segment of the RLC SDU.

In one embodiment, the send state variable may be used for holding a sequence number to be allocated to a next generated PDU, or may be used for holding a sequence number to be allocated to a next received RLC SDU.

In one embodiment, the send state variable may be updated when the RLC entity transmits the generated PDU to a lower layer.

In one embodiment, the send state variable may be updated when the RLC entity receives from the lower layer a notification indicating that the generated PDU can be transmitted.

In one embodiment, the send state variable may be updated when the RLC entity associates the send state variable with a sequence number of the received SDU.

In one embodiment, the send state variable may be updated when the RLC entity deletes the generated PDU or the SDU to which a sequence number has been allocated.

According to another aspect of the present disclosure, user equipment is provided, comprising a processor and a memory. The memory has instructions stored thereon, and the instructions, when run by the processor, cause the user equipment to execute the method executed by user equipment described above.

BRIEF DESCRIPTION OF THE DRAWINGS

The above and other features of the present disclosure will become more apparent with the following detailed description in conjunction with the accompanying drawings.

It should be noted that the accompanying drawings are not necessarily drawn to scale, with a focus on illustrating the principles of the techniques disclosed herein. Additionally, for clarity, like reference numerals refer to similar elements throughout the accompanying drawings.

DETAILED DESCRIPTION

The present disclosure is described below in detail with reference to the accompanying drawings and specific embodiments. It should be noted that the present disclosure should not be limited to the specific embodiments described below. In addition, for simplicity, detailed description of the known art not directly related to the present disclosure is omitted to avoid obscuring the understanding of the present disclosure.

Some terms involved in the present disclosure are introduced first. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may represent a PDCP in NR or LTE or eLTE.

RLC: Radio Link Control. In the present disclosure, if not specifically indicated, the RLC may represent RLC in NR or LTE or eLTE. An RLC entity may be an Unacknowledged Mode (UM) RLC entity or an Acknowledged Mode (AM) RLC entity.

In an AM RLC entity, an RLC header is added to an RLC SDU or a segment of the RLC SDU to obtain an AM data PDU (AMD PDU). In a UM RLC entity, an RLC header is added to an RLC SDU or a segment of the RLC SDU to obtain a UM data PDU (UMD PDU). An RLC data PDU may be an AMD PDU or a UMD PDU, but does not include an RLC control PDU.

MAC: Medium Access Control. In the present disclosure, if not specifically indicated, the MAC may represent MAC in NR or LTE or eLTE.

PDU: Protocol Data Unit.

SDU: Service Data Unit.

In the present disclosure, data received from or transmitted to an upper layer is referred to as an SDU, and data transmitted to or received from a lower layer is referred to as a PDU. For example, data received from or transmitted to the upper layer by a PDCP entity is referred to as a PDCP SDU; data received from or transmitted to an RLC entity by a PDCP entity is referred to as a PDCP PDU (namely, RLC SDU).

Figure 1:
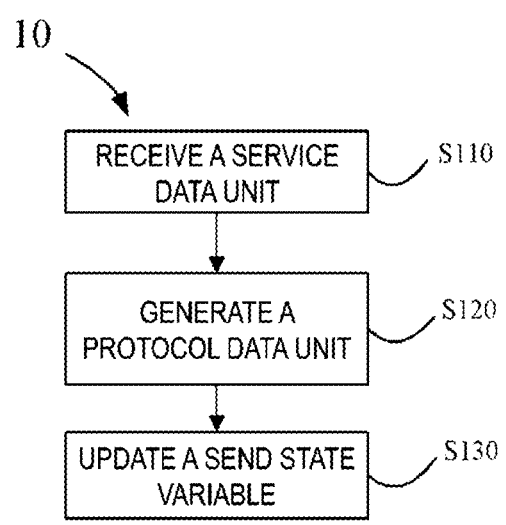
FIG. 1 is a flowchart of a method executed by user equipment according to an embodiment of the present disclosure.

FIG. 1 is a flowchart of a method 10 executed by user equipment (UE) according to an embodiment of the present disclosure.

As shown in FIG. 1, in step S110, a radio link control (RLC) entity in the UE receives a service data unit (SDU) from an upper layer (for example, a PDCP entity).

In step S120, the RLC entity generates a protocol data unit (PDU). The PDU includes at least a part of the received SDU. For example, the PDU may include the complete RLC SDU or a part of the RLC SDU.

A sequence number of the PDU is set according to a send state variable. For example, the sequence number of the PDU may be set to the value of the send state variable or set to a value corresponding to the value of the send state variable. In the present disclosure, the send state variable may be used for holding a sequence number to be allocated to a next generated PDU. Alternatively, the send state variable may also be used for holding a sequence number to be allocated to a next received RLC SDU.

In step S130, the RLC entity updates the send state variable. For example, the value of the send state variable may be incremented if the generated PDU includes the RLC SDU or a first segment or the first byte of the RLC SDU. The value of the send state variable may also be incremented if the generated PDU includes the RLC SDU or the last segment or the last byte of the RLC SDU.

The send state variable may be updated in the following occasions: when the RLC entity transmits to the lower layer the generated PDU, or when the RLC entity receives from the lower layer a notification indicating that the generated PDU can be transmitted, or when the RLC entity associates the value of the send state variable with the sequence number of the received SDU, or when the RLC entity deletes the generated PDU, or when the RLC entity deletes the SDU to which a sequence number has been allocated.

The details of the method executed by the UE shown in FIG. 1 are described in detail below through specific examples.

EXAMPLE 1

An AM RLC entity receives an RLC SDU from an upper layer (for example, a PDCP entity). Then, the AM RLC entity generates an RLC header for the RLC SDU received from the upper layer so as to generate an RLC PDU. When the AM RLC entity transmits to the lower layer (for example, a MAC entity) an AMD PDU including the RLC SDU (namely, an unsegmented RLC SDU or a complete RLC SDU) or an AMD PDU including one segment of an RLC SDU, a sequence number SN of the AMD PDU may be set to a send state variable TX_Next, or the sequence number SN of the AMD PDU may be set to the value of the send state variable TX_Next corresponding to the RLC SDU. The value of the send state variable TX_Next may be increased by 1 if the transmitted AMD PDU includes one RLC SDU or a first segment or the first byte of one RLC SDU.

EXAMPLE 2

An AM RLC entity receives an RLC SDU from an upper layer (for example, a PDCP entity). Then, the AM RLC entity generates an RLC header for the RLC SDU received from the upper layer so as to generate an RLC PDU. When the AM RLC entity transmits to the lower layer (for example, a MAC entity) an AMD PDU including the RLC SDU (namely, an unsegmented RLC SDU or a complete RLC SDU) or an AMD PDU including one segment of an RLC SDU, a sequence number SN of the AMD PDU may be set to a send state variable TX_Next, or the sequence number SN of the AMD PDU may be set to the value of the send state variable TX_Next corresponding to the RLC SDU. The value of the send state variable TX_Next may be increased by 1 if the transmitted AMD PDU includes one RLC SDU or the last segment or the last byte of one RLC SDU.

EXAMPLE 3

An AM RLC entity receives an RLC SDU from an upper layer (for example, a PDCP entity). Then, the AM RLC entity generates an RLC header for the RLC SDU received from the upper layer so as to generate an RLC PDU. When the AM RLC entity transmits to the lower layer (for example, a MAC entity) an AMD PDU including the RLC SDU (namely, an unsegmented RLC SDU or a complete RLC SDU), a sequence number SN of the AMD PDU may be set to a send state variable TX_Next, or the sequence number SN of the AMD PDU may be set to the value of the send state variable TX_Next corresponding to the RLC SDU, and the value of TX_Next is increased by 1.

When the AM RLC entity transmits to the lower layer (for example, a MAC entity) an AMD PDU including a segment of an RLC SDU, the sequence number SN of the AMD PDU may be set to the send state variable TX_Next, or the sequence number SN of the AMD PDU may be set to the value of the send state variable TX_Next corresponding to the RLC SDU. The value of the send state variable TX_Next may be increased by 1 if the transmitted AMD PDU includes the last segment or the last byte (or the first segment or the first byte) of one RLC SDU.

EXAMPLE 4

An AM RLC entity receives an RLC SDU from an upper layer (for example, a PDCP entity). Then, the AM RLC entity generates an RLC header for the RLC SDU received from the upper layer so as to generate an RLC PDU. Furthermore, the sequence number SN of the RLC SDU is set to be equal to the value of a send state variable TX_Next and the value of the send state variable TX_Next is increased by 1. When the AM RLC entity transmits to the lower layer (for example, a MAC entity) an AMD PDU including a segment of the RLC SDU, a sequence number SN of the AMD PDU may be set to the sequence number of the RLC SDU corresponding thereto.

The send state variable TX_Next and an update process thereof are described in detail below.

In the present disclosure, the send state variable TX_Next may be used for holding a sequence number to be allocated to a next newly generated AMD PDU. Alternatively, the send state variable TX_Next may be used for holding a sequence number to be allocated to a next RLC SDU (or an RLC SDU received from the upper layer). Furthermore, the send state variable TX_Next may be used for holding a next sequence number following an allocated sequence number. The send state variable TX_Next may also be used for holding a sequence number to be allocated to a next newly generated AMD PDU, where the AMD PDU may be an AMD PDU submitted to the lower layer or transmitted after reception of a transmission opportunity notification from the lower layer.

It should be noted that in the present disclosure, an initial value of the send state variable TX_Next may be set to 0.

In one embodiment, when the AM RLC entity transmits an AMD PDU having a sequence number being TX_Next, the send state variable TX_Next is updated. The AMD PDU may include the last byte or segment of one RLC SDU, or the AMD PDU may include one RLC SDU (or a complete RLC SDU or an unsegmented RLC SDU) or the last byte or segment of one RLC SDU. Alternatively, the AMD PDU may include the first byte or segment of one RLC SDU, or the AMD PDU may include one RLC SDU (or a complete RLC SDU or an unsegmented RLC SDU) or the first byte or segment of one RLC SDU.

In one embodiment, when the AM RLC entity receives a transmission opportunity notification from the lower layer to transmit an AMD PDU having a sequence number being TX_Next, the send state variable TX_Next is updated. The AMD PDU may include the last byte or segment of one RLC SDU, or the AMD PDU may include one RLC SDU (or a complete RLC SDU or an unsegmented RLC SDU) or the last byte or segment of one RLC SDU. Alternatively, the AMD PDU may include the first byte or segment of one RLC SDU, or the AMD PDU may include one RLC SDU (or a complete RLC SDU or an unsegmented RLC SDU) or the first byte or segment of one RLC SDU.

In one embodiment, the send state variable TX_Next may be updated when the AM RLC entity associates a sequence number of an RLC SDU received from the upper layer with the send state variable TX_Next.

In one embodiment, the send state variable TX_Next may be updated when the AM RLC entity receives from the upper layer one RLC SDU and constructs an AMD_PDU having a sequence number being TX_Next. The AMD PDU may include the last byte or segment of one RLC SDU, or the AMD PDU may include one RLC SDU (or a complete RLC SDU or an unsegmented RLC SDU) or the last byte or segment of one RLC SDU. Alternatively, the AMD PDU may include the first byte or segment of one RLC SDU, or the AMD PDU may include one RLC SDU (or a complete RLC SDU or an unsegmented RLC SDU) or the first byte or segment of one RLC SDU.

In one embodiment, the send state variable TX_Next is updated when the AM RLC entity associates a sequence number of an RLC SDU received from the upper layer with the send state variable TX_Next and/or constructs an AMD PDU having a sequence number being the send state variable TX_Next (or when the AM RLC entity constructs, for the RLC SDU received from the upper layer, an AMD PDU having a sequence number being the send state variable TX_Next). The AMD PDU may include the first byte or segment of one RLC SDU, or the AMD PDU may include one RLC SDU (or a complete RLC SDU or an unsegmented RLC SDU) or the first byte or segment of one RLC SDU. Alternatively, the AMD PDU may include the last byte or segment of one RLC SDU, or the AMD PDU may include one RLC SDU (or a complete RLC SDU or an unsegmented RLC SDU) or the last byte or segment of one RLC SDU.

In one embodiment, when the AM RLC entity deletes one AMD PDU or one RLC SDU to which a sequence number has been allocated or of which a sequence number has been associated, the send state variable TX_Next may be updated or a new AMD PDU including only an RLC header may be generated (alternatively, an AMD PDU including no load or data may be generated) and a sequence number of the AMD PDU is a sequence number corresponding to the deleted RLC SDU or AMD PDU. Likewise, when a UM RLC entity deletes one UMD PDU or an RLC SDU to which a sequence number has been allocated, the send state variable TX_Next corresponding to the UM entity may be updated or a new UMD PDU including only an RLC header may be generated (alternatively, a UMD PDU including no load or data may be generated), and a sequence number of the UMD PDU is a sequence number corresponding to the deleted RLC SDU or UMD PDU. The send state variable TX_Next corresponding to the above UM entity may be used for holding the value of a sequence number to be allocated to a next newly generated UMD PDU. An initial value of the send state variable may be 0. The send state variable may be updated when the UM RLC entity transmits a UMD PDU including the last segment or byte of one RLC SDU.

In the present disclosure, calculations for the send state variable TX_Next (for example, the value of TX_Next is increased by 1) can be performed as follows: if the sequence number is represented by, for example, 12 bits, then a value range of TX_Next is 0 to 4095. Then, the value of TX_Next equals a remainder of the calculated value modulo 4096. Furthermore, if the sequence number is represented by 18 bits, then the value range of TX_Next is 0 to 262143. Then, the value of TX_Next equals a remainder of the calculated value modulo 262144.

Furthermore, the setting a sequence number (or the value of the sequence number) to the send state variable TX_Next described in the present disclosure means setting the sequence number (or the value of the sequence number) to the value of the send state variable TX_Next.

Figure 2:
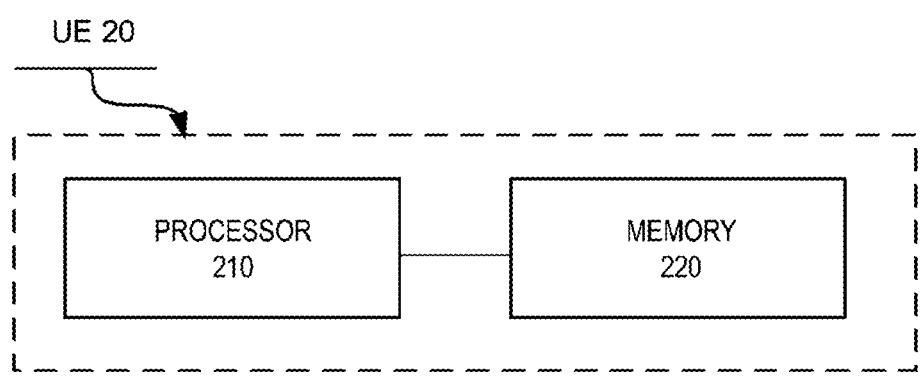
FIG. 2 is a block diagram of user equipment according to an embodiment of the present disclosure.

FIG. 2 is a block diagram of user equipment 20 according to an embodiment of the present disclosure. As shown in FIG. 2, the user equipment 20 includes a processor 210 and a memory 220. The processor 210 may, for example, include a microprocessor, a microcontroller, an embedded processor, or the like. The memory 220 may, for example, include a volatile memory (for example, a random access memory (RAM)), a hard disk drive (HDD), a non-volatile memory (for example, a flash memory), or other memories and the like. Program instructions are stored on the memory 220. The instructions, when run by the processor 210, can perform the aforementioned method performed by user equipment (for example, the method shown in FIG. 1) described in detail in the present disclosure.

The program running on the device according to the present disclosure may be a program that controls a central processing unit (CPU) so as to enable a computer to implement the functions of the embodiments of the present disclosure. The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by the computer system by reading programs recorded on the recording medium and executing the programs. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A method performed by a user equipment, the method comprising:
   receiving, from an upper layer of the user equipment, a radio link control (RLC) service data unit (SDU);
   constructing, by an acknowledged mode (AM) RLC entity of the user equipment, an acknowledged mode data (AMD) protocol data unit (PDU) by setting a sequence number of the AMD PDU according to a send state variable; and
   incrementing the send state variable by one, wherein:
   the send state variable holds a value of the sequence number to be assigned for a next newly generated AMD PDU,
   the send state variable is initially set to 0, and
   the send state variable is updated whenever the AM RLC entity constructs the AMD PDU with the sequence number which is equal to the send state variable, the AMD PDU including an entirety of the RLC SDU.

2. A user equipment, comprising:
   a receiver configured to receive, from an upper layer of the user equipment, a radio link control (RLC) service data unit (SDU); and
   a processor configured to:
   construct, by an acknowledged mode (AM) RLC entity of the user equipment, an acknowledged mode data (AMD) protocol data unit (PDU) by setting a sequence number of the AMD PDU according to a send state variable; and
   increment the send state variable by one, wherein:
   the send state variable holds a value of the sequence number to be assigned for a next newly generated AMD PDU,
   the send state variable is initially set to 0, and
   the send state variable is updated whenever the AM RLC entity constructs the AMD PDU with the sequence number which is equal to the send state variable, the AMD PDU including an entirety of the RLC SDU.

* * * * *